(12) United States Patent
Mizusaki et al.

(10) Patent No.: US 10,115,496 B2
(45) Date of Patent: Oct. 30, 2018

(54) COMPOSITIONS FOR PREPARING ELECTRICALLY CONDUCTIVE COMPOSITES, COMPOSITES PREPARED THEREFROM, AND ELECTRONIC DEVICES INCLUDING THE SAME

(71) Applicant: SAMSUNG ELECTRONICS CO., LTD., Suwon-si, Gyeonggi-do (KR)

(72) Inventors: Soichiro Mizusaki, Suwon-si (KR); Sang Eui Lee, Hwaseong-si (KR); Won Suk Chang, Hwaseong-si (KR); In Taek Han, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 42 days.

(21) Appl. No.: 15/047,790

(22) Filed: Feb. 19, 2016

(65) Prior Publication Data
US 2016/0293290 A1 Oct. 6, 2016

(30) Foreign Application Priority Data
Mar. 30, 2015 (KR) .................. 10-2015-0044557

(51) Int. Cl.
*H01B 1/24* (2006.01)
*B82Y 30/00* (2011.01)

(52) U.S. Cl.
CPC ............. *H01B 1/24* (2013.01); *B82Y 30/00* (2013.01); *Y10S 977/752* (2013.01); *Y10S 977/932* (2013.01)

(58) Field of Classification Search
None
See application file for complete search history.

(56) References Cited

U.S. PATENT DOCUMENTS

| | | | |
|---|---|---|---|
| 8,883,044 B2 | 11/2014 | Kim et al. | |
| 2004/0186220 A1 | 9/2004 | Smalley et al. | |
| 2005/0022929 A1* | 2/2005 | Schoenfeld | C09J 5/06 156/272.2 |
| 2010/0163795 A1 | 7/2010 | Kim et al. | |
| 2011/0104498 A1* | 5/2011 | Turakhia | C08J 5/042 428/411.1 |
| 2014/0306164 A1 | 10/2014 | Restuccia et al. | |
| 2015/0174860 A1* | 6/2015 | Ellis | B32B 3/266 428/220 |

FOREIGN PATENT DOCUMENTS

| | | |
|---|---|---|
| JP | 2007-225315 A | 9/2007 |
| KR | 1020110072946 A1 | 6/2011 |
| KR | 1020120105757 A1 | 9/2012 |
| KR | 1020130038775 A1 | 4/2013 |
| KR | 10-1267272 B1 | 5/2013 |
| KR | 10-1309738 B1 | 9/2013 |
| KR | 1020130116992 A1 | 10/2013 |
| KR | 10-1338199 B1 | 12/2013 |
| KR | 10-1413996 B1 | 6/2014 |
| KR | 1020140105777 A | 9/2014 |

OTHER PUBLICATIONS

Hong et al. Carboxyl-Terminated Butadiene-Acrylonitrile-Modified Epoxy Resin and Its Graphite Fiber-Reinforced Composite. ACS Symposium Series American Chemical Society, Feb. 1984.*
Wang et al Carboxyl-terminated butadiene-acrylonitrile-thoughened epoxy/carboxyl-modifed carbon nanotube nanocomposites: Thermal and mechanical properties. eXPRESS Polymer Letters, vol. 6, No. 9, 2012, 719-728.*
Al-Saleh et al., "Electrical double percolation and carbon nanotubes distribution in solution processed immiscible polymer blend", Synthetic Metals, vol. 175, 2013, pp. 75-80.
Kovacs et al., "Two percolation thresholds in carbon nanotube epoxy composites", Composites Science and Technology, vol. 67, 2007, pp. 922-928.
Meincke et al., "Mechanical properties and electrical conductivity of carbon-nanotube filled polyamide-6 and its blends with acrylonitrile/butadience/styrene", Polymer, vol. 45, 2004, pp. 739-748.
Sumita et al., "Dispersion of fillers and the electrical conductivity of polymer blends filled with carbon black", Polymer Bulletin, vol. 25, 1991, pp. 265-271.
Sumita et al., "Double percolation effect on the electrical conductivity of conductive particles filled polymer blends", Colloid & Polymer Science, vol. 270, 1992, pp. 134-139.
Thomas et al., "Thermophysical Properties of CTBN and HTPB Liquid Rubber Modified Epoxy Blends", Journal of Applied PolymerScience, vol. 116, 2010, pp. 3232-3241.
Wang et al., "Carboxyl-terminated butadiene-acrylonitrile-toughened epoxy/carboxyl-modified carbon nanotube nanocomposites: Thermal and mechanical properties", eXPRESS Polymer Letters, vol. 6, No. 9, 2012, pp. I 719-I 728.

* cited by examiner

*Primary Examiner* — Tanisha Diggs
(74) *Attorney, Agent, or Firm* — Harness, Dickey & Pierce, P.L.C.

(57) ABSTRACT

A composition for preparing an electrically conductive composite includes, based on the total weight of the composition:
  about 37 weight percent to about 84 weight percent of an epoxy;
  about 0.001 weight percent to about 22 weight percent of an electrically conductive filler; and
  about 15 weight percent to about 45 weight percent of a thermoplastic resin, wherein the thermoplastic resin is a liquid at about 25° C., is miscible with the epoxy, and forms a domain upon heat curing that is phase-separated from the epoxy and the electrically conductive inorganic filler. Also composites prepared therefrom and an electronic device including the same.

15 Claims, 6 Drawing Sheets

COMPOSITIONS FOR PREPARING ELECTRICALLY CONDUCTIVE COMPOSITES, COMPOSITES PREPARED THEREFROM, AND ELECTRONIC DEVICES INCLUDING THE SAME

CROSS-REFERENCE TO RELATED APPLICATION

This application claims priority to and the benefit of Korean Patent Application No. 10-2015-0044557, filed in the Korean Intellectual Property Office on Mar. 30, 2015, and all the benefits accruing therefrom under 35 U.S.C. § 119, the entire content of which is incorporated herein by reference.

BACKGROUND

1. Field

A composition for preparing an electrically conductive composite, a composite prepared therefrom, and an electronic device including the same are disclosed.

2. Description of the Related Art

Research on application of a composite including an electrically conductive filler, for example, carbon nanotubes in a polymer matrix, to an electronic device such as an actuator is in progress. The application of this composite to a stretchable or wearable electronic device that has recently drawn attention has been suggested. However, such composites have insufficient electrical properties, e.g., low contact resistance and high electrical conductivity, for successful use in an electronic device. Thus there remains a need for an improved composite having improved properties.

SUMMARY

An embodiment provides a composition providing an electrically conductive composite having sufficient electrical properties to be applied to a stretchable electronic device and the like even when a small amount of an electrically conductive filler is included therein.

Another embodiment provides an electrically conductive composite prepared from the composition.

Yet another embodiment provides an electronic device including the electrically conductive composite.

In an embodiment, a composition for preparing an electrically conductive composite includes, based on the total weight of the composition:

about 37 weight percent to about 84 weight percent of an epoxy;

about 0.001 weight percent to about 22 weight percent of an electrically conductive filler; and about 15 weight percent to about 45 weight percent of a thermoplastic resin, wherein the thermoplastic resin is a liquid at about 25° C., is miscible with the epoxy, and forms a domain upon heat curing that is phase-separated from the epoxy and the electrically conductive inorganic filler.

The epoxy may include an epoxy resin having two or more epoxy groups per molecule.

The epoxy resin may be one or more selected from glycidyl ethers of bisphenol A, bisphenol F, dihydroxyphenyl diphenylsulfone, dihydroxybenzophenone, dihydroxydiphenyl, a novolac epoxy resin, a glycidyl functional group reactive product of m-aminophenol or p-aminophenol, m-phenylene diamine, p-phenylene diamine, 2,4-toluylene diamine, 2,6-toluylene diamine, 3,4-toluylene diamine, 3,3'-diaminodiphenyl methane, and 4,4'-diaminodiphenyl methane.

The epoxy resin may be one or more selected from diglycidyl ether of bisphenol A (DGEBA), diglycidyl ether of bisphenol F (DGEBF), O,N,N-triglycidyl-para-aminophenol (TGPAP), O,N,N-triglycidyl-meta-aminophenol (TGMAP), and N,N,N',N'-tetraglycidyl diaminodiphenyl methane (TGDDM).

The electrically conductive filler may include one or more selected from carbon nanotubes, boron nitride nanotubes, carbon black, graphene, graphite, a conductive metal (e.g., nickel) filament, a conductive metal (e.g., copper or silver) nanowire, and a conductive metal oxide particulate.

In an embodiment, the electrically conductive filler does not include a functional group capable of a condensation reaction with the thermoplastic resin.

The thermoplastic resin may be a diene-based copolymer having a carboxyl group at the terminal end thereof and a nitrile group on the main chain.

In a composition according to an embodiment, the electrically conductive filler may include carbon nanotubes having a carboxyl group at a surface of the filler, and the thermoplastic resin may include a butadiene-acrylonitrile copolymer having a carboxyl group at a terminal end of the copolymer.

The heating may be performed at a temperature of greater than or equal to about 50° C. and less than or equal to about 150° C.

The composition may include about 20 weight percent (wt %) to about 40 wt % of the thermoplastic resin, and about 0.004 to about 1 wt % of the electrically conductive filler, based on the total weight of the composition.

The separated domain may have a longest diameter of less than or equal to about 50 μm.

In another embodiment, a conductive polymer composite including a cured product of the composition is provided.

The electrically conductive composite may include a first domain including the thermoplastic resin and phase-separated from the epoxy and the electrically conductive filler, and a second domain including the epoxy and the electrically conductive filler.

The first domain may have a largest diameter of less than or equal to about 50 μm.

The electrically conductive composite may have electrical conductivity of greater than or equal to about 0.01 S/m.

In yet another embodiment, an electronic device including the electrically conductive composite is provided.

The electronic device may be a stretchable organic light emitting diode (OLED) display, a stretchable human motion sensor, a stretchable artificial muscle, a stretchable actuator, or a stretchable semiconductor.

According to the embodiments, the composition may provide an electrically conductive composite that may show enhanced electrical properties (e.g., low contact resistance and higher electrical conductivity) without a substantial decrease of mechanical properties (e.g., stretchability) even when the composition includes a reduced amount of the electrically conductive filler. The prepared composites may be stretchable, deformable, and/or foldable, and may find their use as an elastic conductor or as an interconnector in an electronic device or in an electronic part having a complicated shape.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Exemplary embodiments will now be described more fully with reference to the accompanying drawings, in which some exemplary embodiments are shown. The exemplary embodiments, may, however, be embodied in many different forms and should not be construed as being limited to the embodiments set forth herein; rather, these exemplary embodiments are provided so that this disclosure will be thorough and complete, and will fully convey the scope of the exemplary embodiments of inventive concepts to those of ordinary skill in the art. Therefore, in some exemplary embodiments, well-known process technologies may not be explained in detail in order to avoid unnecessarily obscuring of aspects of the exemplary embodiments. If not defined otherwise, all terms (including technical and scientific terms) in the specification may be defined as commonly understood by one skilled in the art. The terms defined in a generally-used dictionary are not to be interpreted ideally or exaggeratedly unless clearly defined. In addition, unless explicitly described to the contrary, the word "comprise" and variations such as "comprises" or "comprising" will be understood to imply the inclusion of stated elements but not the exclusion of any other elements.

Further, the singular includes the plural unless mentioned otherwise. Thus the singular forms "a," "an," and "the" are intended to include the plural forms, including "one or more," unless the content clearly indicates otherwise.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "deformable substrate" includes a stretchable or plastically deformable substrate, and the deformation may include flexural deformation, elongational deformation, twist deformation, shear deformation, compression deformation, or a combination thereof.

As used herein, "forming a domain separated from the epoxy and the electrically conductive inorganic filler" refers to formation of a separate domain that is distinguished from a mixture of the epoxy and the electrically conductive inorganic filler. The formation of the domain separated from the epoxy and the electrically conductive inorganic filler may be confirmed by scanning electron microscopy of the composite.

As used herein, the term "epoxy" refers to a mixture of an epoxy resin and a hardener. When the epoxy includes a hardener, the type of the epoxy resin and the hardener, and a weight ratio of the epoxy resin and the hardener, may be controlled if desired (e.g., in light of desirable mechanical properties of a composite), and thus are not particularly limited. For example, the epoxy may include 0.1 parts by weight to 80 parts by weight of the hardener, based on 100 parts by weight of the epoxy resin, without limitation.

In order to provide a composite having greater conductivity, an attempt to increase the amount of the electrically conductive filler introduced into the composite has been made. However, when the amount of the electrically conductive filler is increased, mechanical properties (e.g., stretchability) of the composite may be deteriorated. Disclosed is a composite that provides an improved combination of electrical and mechanical properties.

In an embodiment, the composition is suitable for the preparation of an electrically conductive composite. The composition includes:

about 37 weight percent (wt %) to about 84 wt % of an epoxy;

about 0.001 wt % to about 22 wt % of an electrically conductive filler; and about 15 wt % to about 45 wt % of a thermoplastic resin, based on a total weight of the composition. The thermoplastic resin may be a resin which is a liquid at about 25° C., is miscible with the epoxy, and is cured by heating it to form a domain separated from the epoxy and the electrically conductive inorganic filler.

The epoxy may include an epoxy resin having at least two amine groups per molecule. Also, the epoxy resin may be a compound having 2, 3, 4, or more epoxy groups per molecule. The epoxy resin may include one or more selected from a glycidylether of bisphenol A, bisphenol F, dihydroxyphenyl diphenylsulfone, dihydroxybenzophenone, dihydroxydiphenyl, a novolac epoxy resin, a glycidyl functional group reactive product of m-aminophenol or p-aminophenol, m-phenylene diamine, p-phenylene diamine, 2,4-toluylene diamine, 2,6-toluylene diamine, 3,4-toluylene diamine, 3,3'-diaminodiphenyl methane, and 4,4'-diaminodiphenyl methane. The epoxy resin may comprise one or more selected from a diglycidyl ether of bisphenol A (DGEBA), a diglycidyl ether of bisphenol F (DGEBF), O,N,N-triglycidyl-para-aminophenol (TGPAP), O,N,N-triglycidyl-meta-aminophenol (TGMAP), and N,N,N',N'-tetraglycidyl diaminodiphenyl methane (TGDDM).

The hardener of the epoxy is a compound including a group capable of reacting with an epoxy group of the epoxy resin. For example, the hardener may comprise one or more selected from an aromatic amine compound having two or more amine groups per molecule, an aliphatic amine compound having two or more amine groups per molecule, a guanidine compound, and an acid anhydride. For non-limiting examples, the hardener having an amine group may include one or more selected from 3,3'-diaminodiphenylsulfone, 4,4'-diaminodiphenylsulfone (DDS), methylenedianiline, bis(4-amino-3,5-dimethylphenyl)-1,4-diisopropylbenzene, bis(4-aminophenyl)-1,4-diisopropylbenzene, 4,4'-methylenebis-(2,6-diethyl)-aniline (MDEA), 4,4'-methylenebis-(3-chloro, 2,6-diethyl)-aniline (MCDEA), 4,4'-methylenebis-(2,6-diisopropyl)-aniline (M-DIPA), 3,5-diethyl toluene-2,4/2,6-diamine (D-ETDA 80), 4,4'-methylenebis-(2-isopropyl-6-methyl)-aniline (M-MIPA), 4-chlorophenyl-N,N-dimethyl-urea, 3,4-dichlorophenyl-N,N-dimethyl-urea, dicyanodiamide, and polyetheramine.

In non-limiting examples, the hardener may include an acid anhydride. For example, the hardener may include one or more selected from polycarboxylic anhydride, nadic anhydride, methylnadic anhydride, phthalic anhydride, tetrahydrophthalic anhydride, hexahydrophthalic anhydride, methyl tetrahydrophthalic anhydride, endomethylenetetrahydrophthalic anhydride, and trimellitic anhydride, but is not limited thereto. An amount of the hardener may be selected depending on a kind of the epoxy resin and a kind of the hardener, and thus it is not particularly limited.

For example, an amount of the hardener may be greater than or equal to about 0.1 part by weight, for example, greater than or equal to about 1 part by weight, greater than or equal to about 5 parts by weight, greater than or equal to about 10 parts by weight, greater than or equal to about 15 parts by weight, or greater than or equal to about 20 parts by weight based on 100 parts by weight of the epoxy resin. For example, an amount of the hardener may be less than or equal to about 80 parts by weight, for example, less than or equal to about 75 parts by weight, less than or equal to about 70 parts by weight, less than or equal to about 65 parts by weight, less than or equal to about 60 parts by weight, less than or equal to about 55 parts by weight, less than or equal to about 50 parts by weight, less than or equal to about 45 parts by weight, less than or equal to about 40 parts by weight, less than or equal to about 35 parts by weight, or less than or equal to about 30 parts by weight based on 100 parts by weight of the epoxy resin or a precursor thereof.

The composition may selectively include one or more catalysts for accelerating a curing reaction. For example, the catalyst may include a Lewis acid or a base, but is not limited thereto. Non-limiting examples of the catalyst may include one or more selected from boron trifluoride, an addition product of ethylamine, and boron trifluoride. The curing catalyst may be included in an appropriately selected amount depending on kinds of the epoxy resin, the hardener, and the like, but is not limited thereto.

The composition may include about 0.001 wt % to about 22 wt % of the electrically conductive filler and about 15 wt % to about 45 wt % of the thermoplastic resin, based on the total weight of the composition, and the thermoplastic resin may be a resin which is a liquid at about 25° C., is miscible with the epoxy, and can be cured by heating it to form a domain separated from the epoxy and the electrically conductive inorganic filler.

Recently, research on the use of a flexible conductor (e.g., an electrode material) for a stretchable electronic device has been actively undertaken. In addition, a composite including an organic material (e.g., an organic polymer) and an inorganic material (e.g., an electrically conductive filler) as an example of the electrode material has drawn attention. This composite may have desirable electrical properties (e.g., electrical conductivity and the like) depending on a kind and an amount of the electrically conductive filler. Accordingly, an attempt to increase the content of the electrically conductive filler in the composite to obtain improved electrical conductivity, or to surface-treat the electrically conductive filler to improve dispersion, has been made. However, such attempts increase a manufacturing cost of the composite, and particularly, the electrically conductive filler may have a negative influence on mechanical properties (e.g., flexibility) of the composite.

On the contrary, a composition for a composite according to an embodiment includes a thermoplastic resin which is a liquid at room temperature (e.g., 25° C.), and is miscible with the epoxy, and is capable of forming a separate domain from the epoxy and an electrically conductive filler in the composite after curing, to provide improved electrical properties even though the electrically conductive filler is included in a small amount.

Without being bound to a specific theory, the composition according to an embodiment provides improved electrical properties because of the following reason.

Figure 1:
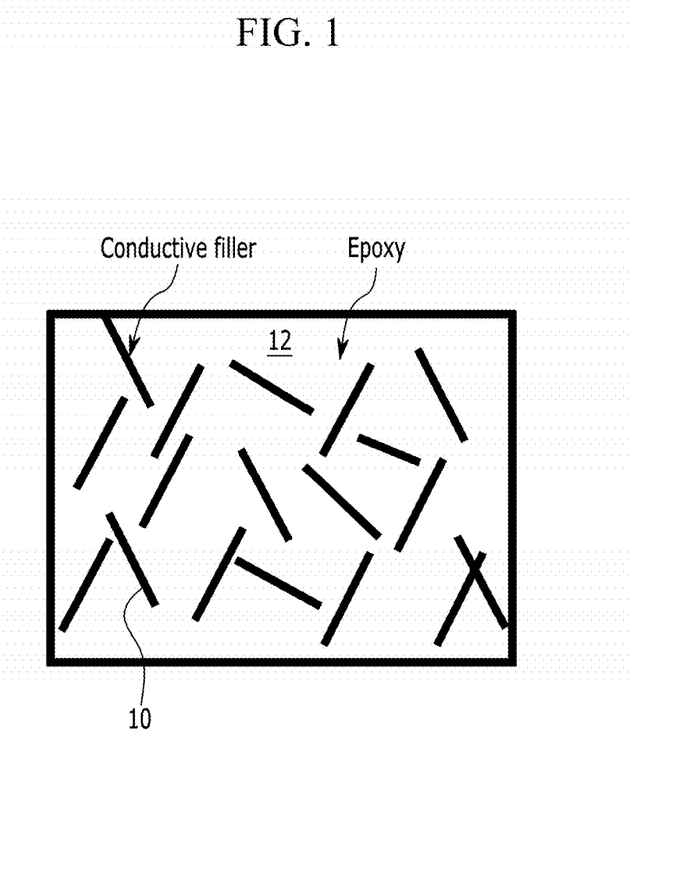
FIG. 1 is a schematic view showing the formation of a composite without phase separation when it includes only epoxy and an electrically conductive filler.
Figure 2:
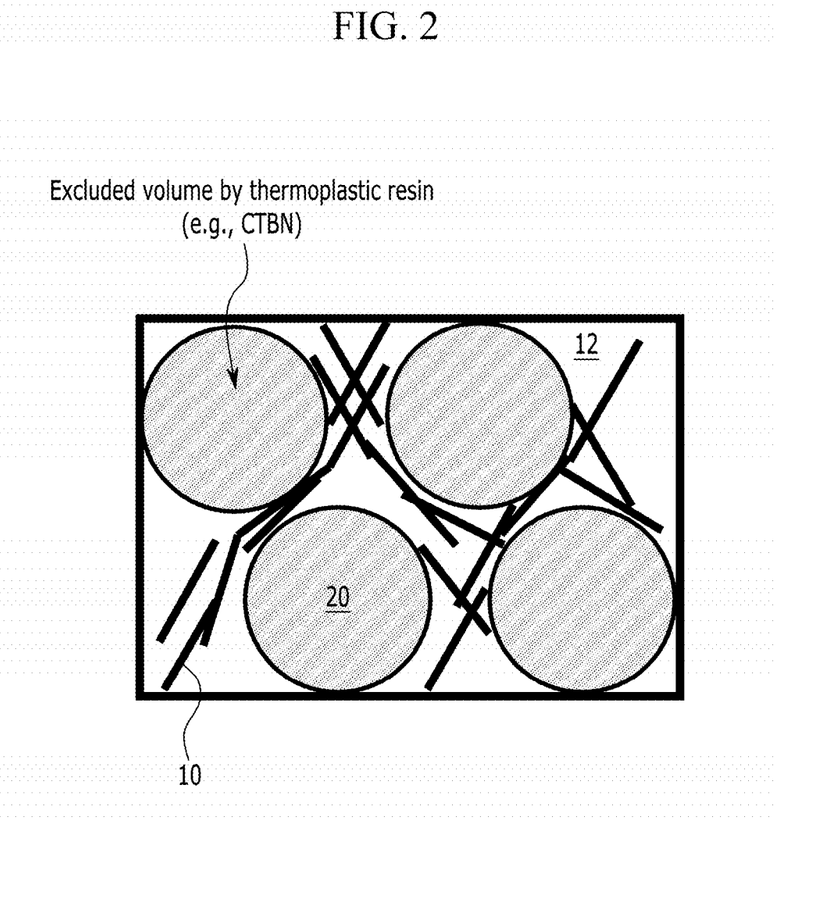
FIG. 2 is a schematic showing that an embodiment of a composition is cured to form a phase-separated domain to provide an excluded volume without the electrically conductive filler.

Referring to FIG. 1, when the electrically conductive filler 10 is well dispersed into the epoxy 12 in the composite, the probability that individual particles of the electrically conductive filler 10 contact each other is low. However, as shown in FIG. 2, a composite formed from the composition for an electrically conductive composite according to an embodiment may include a phase-separated volume 20 which is excluded from the epoxy 12 and the electrically conductive filler 10 due to phase-separation of the thermoplastic resin. The excluded volume 20 may increase contact of the individual particles of the electrically conductive filler with one another, and thus the individual electrically conductive filler, even in a small amount, may contact one another and form a conductive network in the composite. Accordingly, even when the composite includes a filler in a small amount, the composite may show relatively high electrical conductivity, may be manufactured with a lower cost, and may have improved mechanical properties (e.g., stretchability).

In the composition for preparing an electrically conductive composite according to an embodiment, the electrically conductive filler may include one or more selected from carbon nanotubes, boron nitride nanotubes, carbon black, graphene, graphite, a conductive metal (e.g., nickel) filament, a conductive metal (e.g., copper or silver) nanowire, and a conductive metal oxide particulate. As used herein, the carbon nanotubes may include a carbon nanoparticle, a carbon nanofiber, a carbon nanorope, a carbon nanoribbon, a carbon nanofibril, a carbon nanoneedle, a carbon nanorod, a carbon nanocone, and the like. The carbon nanotube may include a single-walled carbon nanotube (SWCNT), a double-walled carbon nanotube (DWCNT), a multi-walled carbon nanotube (MWCNT), or a combination thereof, but is not limited thereto. The carbon nanotube may be commercially available, or may be synthesized by any suitable method (e.g., chemical vapor deposition, catalytic chemical vapor deposition, carbon catalytic vapor deposition, a high pressure carbon monoxide process, an arc discharging method, laser evaporation, and the like).

An aspect ratio of the electrically conductive filler may be less than or equal to about $10^7$, for example, less than or equal to about $10^6$, less than or equal to about $10^5$, or less than or equal to about $10^4$, or about 100 to about $10^7$, or about 1000 to about $10^6$. A diameter (e.g., exterior diameter) of the electrically conductive nanofiller (e.g., carbon nanotubes) may be about 0.4 nanometers (nm) to about 100 nm, for example, less than or equal to about 20 nm, but is not limited thereto.

In a composition according to an embodiment, an amount of the electrically conductive filler may be less than or equal to about 22 wt %, for example, less than or equal to about 11 wt %, less than or equal to about 10.6 wt %, less than or equal to about 5.5 wt %, less than or equal to about 4 wt %, less than or equal to about 3 wt %, less than or equal to about 2 wt %, less than or equal to about 1 wt %, or less than or equal to about 0.9 wt %, less than or equal to about 0.8 wt %, less than or equal to about 0.7 wt %, less than or equal to about 0.6 wt %, less than or equal to about 0.5 wt %, less than or equal to about 0.4 wt %, or less than or equal to about 0.3 wt % based on the total weight of the composition. For example, in the composition, an amount of the electrically conductive filler may be greater than or equal to about 0.001 wt %, for example, greater than or equal to about 0.004 wt %, greater than or equal to about 0.01 wt %, greater than or equal to about 0.02 wt %, greater than or equal to about 0.1 wt %, greater than or equal to about 0.2 wt %, or greater than or equal to about 0.3 wt %. Even when the composition includes a relatively small amount of electrically conductive filler, the composite prepared from the composition may have electrical conductivity of greater than or equal to about 0.001 S/m, for example, greater than or equal to about 0.01 S/m, or greater than or equal to about 0.1 S/m, such as about 0.001 S/m to about $10^5$ S/m, or about 0.01 S/m to about $10^4$ S/m.

In an embodiment, the electrically conductive filler has an untreated surface. In other words, the electrically conductive filler has no functional group intentionally disposed on a surface thereof, for example, no carboxyl group capable of performing a condensation reaction with the thermoplastic resin on the surface thereof. Accordingly, the composite manufactured from the composition may include an excluded volume of the thermoplastic resin, and thus, the individual particles of the electrically conductive filler, when included in a small amount, effectively contact one another in the composite and to provide improved conductivity of the composite. Surface treatment is a method of adjusting a surface energy of the electrically conductive filler. Accordingly, in another embodiment, a surface treatment to select the surface energy of the filler can enable the fillers to be distributed only in the epoxy, depending on a combination of the epoxy and the thermoplastic resin phase-separated therefrom.

The thermoplastic resin may be a diene-based copolymer having a carboxyl group at a terminal end and a nitrile group on the main chain. For example, the thermoplastic resin may be a butadiene-acrylonitrile copolymer having a carboxyl group at its terminal end. The composition may include greater than or equal to about 15 wt %, greater than or equal to about 16 wt %, greater than or equal to about 17 wt %, greater than or equal to about 18 wt %, greater than or equal to about 19 wt %, or greater than or equal to about 20 wt % of the thermoplastic resin, based on a total weight of the composition. The composition may include less than or equal to about 45 wt %, less than or equal to about 44 wt %, less than or equal to about 43 wt %, less than or equal to about 40 wt %, less than or equal to about 39 wt %, or less than or equal to about 38 wt % of the thermoplastic resin, based on a total weight of the composition.

For achieving the phase-separation and the formation of the excluded volume of the thermoplastic resin, the composition may be heated at a temperature of about 50° C. to about 180° C., for example, about 80° C. to about 150° C. In the composite formed by heat treatment, the largest diameter of the excluded volume (i.e., thermoplastic resin domain) may be less than or equal to about 50 micrometers (μm), less than or equal to about 45 μm, less than or equal to about 40 μm, less than or equal to about 35 μm, or less than or equal to about 30 μm. In the composite formed by heat treatment, a diameter of the separated domain may be greater than or equal to about 500 nm. The composition may be prepared by mixing the epoxy (e.g., the epoxy resin and the hardener), the electrically conductive filler, and the thermoplastic resin at predetermined amounts. The order and the manner of the mixing are not particularly limited. For example, the epoxy resin and the hardener may be first mixed, the thermoplastic resin and the electrically conductive filler may be added to the mixture in any suitable order or simultaneously, and the resulting mixture is stirred to provide a final composition. The mixing and the stirring may be performed at an appropriate temperature (e.g., greater than or equal to about 50° C.) by using a mechanical agitator (e.g., a C mixer, a three roll mill, and the like), but the present disclosure is not limited thereto.

In another embodiment, a conductive polymer composite including a cured product of the composition is provided. The curing of the composition may be performed under an appropriate condition such as heating. For example, the curing may be, for example, performed in an air atmosphere at a temperature of about 50° C. to about 180° C., and optionally under a reduced pressure, but the present disclosure is not limited thereto.

The electrically conductive composite may include a first domain including the thermoplastic resin, which is separated from, e.g., phase separated from, the epoxy and the electrically conductive filler, and a second domain including the epoxy and the electrically conductive filler. The largest diameter of the first domain may be less than or equal to about 100 μm, less than or equal to about 50 μm, less than or equal to about 45 μm, less than or equal to about 40 μm, less than or equal to about 35 μm, or less than or equal to about 30 μm. The largest diameter of the first domain may be greater than or equal to about 100 nm, for example, greater than or equal to about 500 nm.

The electrically conductive composite may provide relatively high electrical conductivity even when it is included in a small amount of the electrically conductive filler. The electrically conductive composite may have an electrical conductivity that is selected by adjusting the amount of the electrically conductive filler. For example, the electrically conductive composite may have an electrical conductivity of greater than or equal to about 0.001 S/m, for example, greater than or equal to about 0.01 S/m, greater than or equal to about 1 S/m, or greater than or equal to about 10 S/m, e.g., about 0.001 S/m to about $10^5$ S/m, or about 0.01 S/m to about $10^4$ S/m.

The electrically conductive composite according to the above embodiment may be used as an electrically conductive member of an electronic device. In an embodiment, the electronic device may be a stretchable electronic device. For example, the electronic device may be a stretchable organic light emitting diode (OLED) display, a stretchable human motion sensor, a stretchable artificial muscle, stretchable actuator, or a stretchable semiconductor.

Hereinafter, the embodiments are illustrated in more detail with reference to examples. These examples, however, are not in any sense to be interpreted as limiting the scope of this disclosure.

EXAMPLES

I. Electrical Conductivity Change Evaluation of Composite Depending on Content of Thermoplastic Resin and Carbon Nanotubes

[1] Preparation of Composite

Diglycidylether (DGEBA) of bisphenol A (Trade name: YD-128, Manufacturer: Kukdo Chemical Co., Ltd.) as an epoxy resin, polyetheramine (Trade name: D230, Manufacturer: Huntsman International LLC.) as a hardener, multi-walled carbon nanotubes (average diameter: 9 nm to 15 nm, average length: 1 um to 10 um, Trade name: NC7000, Manufacturer: Nanocyl), and a carboxyl-terminal-type butadiene acrylonitrile copolymer (molecular weight: 3800, Trade name: CTBN (carboxyl-terminated butadiene-nitrile) rubber, Manufacturer: Sigma Aldrich Co.) as a thermoplastic resin are mixed in the amounts provided in the following Table 1, obtaining sample compositions 1 to 36.

The compositions are respectively filled in a custom mold and heated and cured using a hot press device (Product: CARVER, Model No.: 3851-0, Company: CARVER, INC) under a pressure of 2 megaPascals (MP) in an air atmosphere. The custom mold is fabricated using a metal plate, a metal mold, a Teflon mold, and a Teflon film. The obtained composites are respectively cured using a hot press device under pressure at 50° C. for 2 hours and additionally at 100° C. for 2 hours, completing the curing process.

[2] Electrical Properties

Electrical conductivity may be obtained from volume resistance (ρv) through the following equation, in which ρ is resistivity and v is volume.

$$S(S/m)=1/\rho v[\Omega m]^{-1}$$

The volume resistance is measured according to a 4-probe method by using a device (Loresta GP MCP-T610, supplied by Mitsubishi Chemical Analytech and Loresta GP MCP-H450, supplied by Mitsubishi Chemical Analytech).

Figure 3:
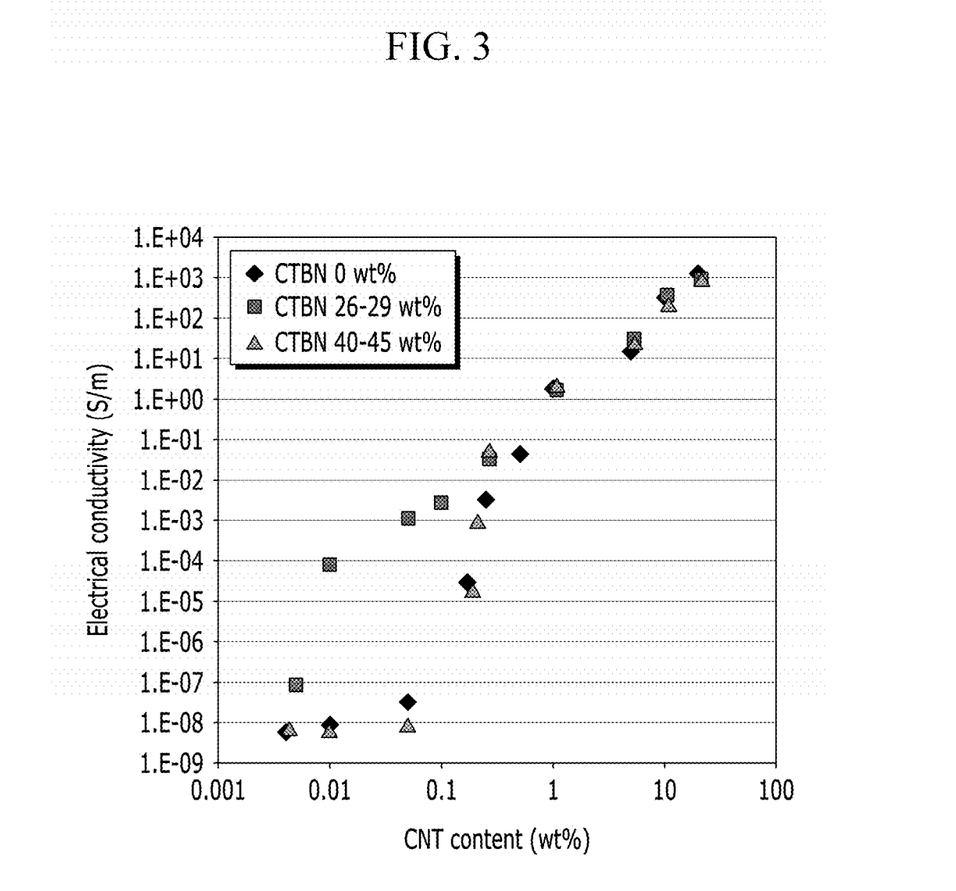
FIG. 3 is a graph of electrical conductivity (Siemens per meter, S/m) vs. carbon nanotube content (weight percent, wt %) showing changes of the composites in the Examples at various contents of a thermoplastic resin and carbon nanotubes.

The results are provided in the following Table 1. FIG. 3 provides plots respectively showing electrical conductivity changes of the composites including no thermoplastic resin (i.e., 0 wt % of a terminal carboxyl butadiene acrylonitrile copolymer (CTBN)) depending on the amount of the carbon nanotube as an electrically conductive filler. FIG. 3 also provides plots respectively showing electrical conductivity changes of the composites including CTBN in a range of 26 wt % to 29 wt %, depending on the amount of the carbon nanotubes as an electrically conductive filler. FIG. 3 also provides plots respectively showing electrical conductivity changes of the composites including CTBN in a range of 40 to 45 wt % depending on the amount of the carbon nanotubes as an electrically conductive filler.

TABLE 1

| Sample Nos. | Epoxy resin wt % | Hardener wt % | CTBN wt % | CNT wt % | Electrical conductivity S/m |
|---|---|---|---|---|---|
| 1 | 80.00 | 20.00 | 0.00 | 0.00000 | $1.50 \times 10^{-9}$ |
| 2 | 80.00 | 20.00 | 0.00 | 0.00400 | $5.80 \times 10^{-9}$ |
| 3 | 80.00 | 20.00 | 0.00 | 0.01000 | $8.60 \times 10^{-9}$ |
| 4 | 79.96 | 19.99 | 0.00 | 0.0500 | $3.26 \times 10^{-8}$ |
| 5 | 79.87 | 19.97 | 0.00 | 0.1700 | $2.94 \times 10^{-5}$ |
| 6 | 79.80 | 9.95 | 0.00 | 0.250 | $3.28 \times 10^{-3}$ |
| 7 | 79.60 | 19.90 | 0.00 | 0.500 | $4.44 \times 10^{-2}$ |
| 8 | 79.20 | 19.80 | 0.00 | 1.00 | 1.80 |
| 9 | 76.00 | 19.00 | 0.00 | 5.00 | 151 |
| 10 | 72.00 | 18.00 | 0.00 | 10.0 | $3.2110^2$ |
| 11 | 64.00 | 16.00 | 0.00 | 20.0 | $1.3010^3$ |
| 12 | 57.14 | 14.29 | 28.57 | 0.00000 | $1.50 \times 10^{-9}$ |
| 13 | 57.14 | 14.29 | 28.57 | 0.00491 | $9.20 \times 10^{-8}$ |
| 14 | 57.14 | 14.28 | 28.57 | 0.01000 | $8.10 \times 10^{-5}$ |
| 15 | 57.11 | 14.28 | 28.57 | 0.05000 | $1.12 \times 10^{-3}$ |
| 16 | 57.07 | 14.27 | 28.56 | 0.10000 | $2.73 \times 10^{-3}$ |
| 17 | 56.96 | 14.24 | 28.54 | 0.27000 | $3.34 \times 10^{-1}$ |
| 18 | 56.77 | 14.19 | 28.51 | 0.53000 | 0.127 |
| 19 | 56.39 | 14.10 | 28.45 | 1.07000 | 1.70 |
| 20 | 53.39 | 13.35 | 27.98 | 5.29000 | 32.0 |
| 21 | 49.66 | 12.41 | 27.35 | 10.58000 | $3.6010^2$ |

TABLE 1-continued

| Sample Nos. | Epoxy resin wt % | Hardener wt % | CTBN wt % | CNT wt % | Electrical conductivity S/m |
|---|---|---|---|---|---|
| 22 | 42.17 | 10.54 | 26.31 | 21.10000 | $9.4010^2$ |
| 23 | 44.44 | 11.11 | 44.44 | 0.00000 | $1.20 \times 10^{-9}$ |
| 24 | 44.44 | 11.11 | 44.44 | 0.00431 | $7.30 \times 10^{-9}$ |
| 25 | 44.44 | 11.11 | 44.44 | 0.01000 | $6.70 \times 10^{-9}$ |
| 26 | 44.41 | 11.10 | 44.44 | 0.05000 | $8.60 \times 10^{-9}$ |
| 27 | 44.32 | 11.08 | 44.44 | 0.19000 | $1.95 \times 10^{-5}$ |
| 28 | 44.31 | 11.08 | 44.44 | 0.21000 | $9.35 \times 10^{-4}$ |
| 29 | 44.26 | 11.07 | 44.44 | 0.27000 | $5.16 \times 10^{-2}$ |
| 30 | 44.08 | 11.02 | 44.35 | 0.55000 | 0.405 |
| 31 | 43.73 | 10.93 | 44.25 | 1.09000 | 2.00 |
| 32 | 40.85 | 10.21 | 43.48 | 5.45000 | 26.0 |
| 33 | 37.27 | 9.32 | 42.53 | 10.89000 | $2.3010^2$ |
| 34 | 30.14 | 7.53 | 40.62 | 21.70000 | $9.8210^2$ |
| 35 | 66.63 | 16.66 | 16.66 | 0.05000 | $4.00 \times 10^{-5}$ |
| 36 | 49.97 | 12.49 | 37.48 | 0.05000 | $8.41 \times 10^{-5}$ |

Referring to the results of Table 1 and FIG. 3, the composites according to one embodiment of the present invention show improved electrical conductivity even when the electrically conductive filler is included in a small amount. For example, in the composite including 50 parts by weight of the CTBN, 0.01 wt % of the filler is needed in order to accomplish electrical conductivity of 0.0001 S/cm and 0.02 wt % of the filler is needed in order to accomplish electrical conductivity of 0.001 S/cm.

In addition, referring to the results of Table 1, the composites according to one embodiment show improved electrical conductivity when the electrically conductive filler is included in an equivalent amount.

II. Confirmation of the Occurrence of the Phase-Separation in Composite due to Addition of Thermoplastic Resin, CTBN

[1] A composition is obtained by mixing 100 parts by weight of diglycidylether of bisphenol A (DGEBA) (Trade name: YD-128, Manufacturer: Kukdo Chemical Co., Ltd.) as an epoxy resin, 25 parts by weight of polyetheramine (Trade name: D230, Manufacturer: Huntsman Co.) as a hardener, 10.58 parts by weight of multi-walled carbon nanotubes (average diameter: 9 nm to 15 nm, average length: 1 um to 10 um, Trade name: NC7000, Manufacturer: Nanocyl), and 28.6 parts by weight of a carboxyl-terminal-type of butadiene acrylonitrile copolymer (molecular weight: 3800, Trade name: CTBN (carboxyl-terminated butadiene-nitrile), Manufacturer: Sigma Aldrich Co.) as a rubber thermoplastic resin according to the same manner as set forth in item I. The composition is heat-treated in the same manner as set forth in item I, obtaining a cured composite. Then, a scanning electron microscope (UHR SEM (SU-9000) supplied by Hitachi Ltd. or Model No.: XL30, Manufacturer: Philips) is used to examine phase-separation, size distribution of a CTBN phase, and morphology of a CNT agglomerate in the epoxy composite. Herein, an electrically conductive metal element is coated on the surface of a sample to prevent a charging effect before obtaining the image. The results are provided in FIG. 4.

Figure 4:
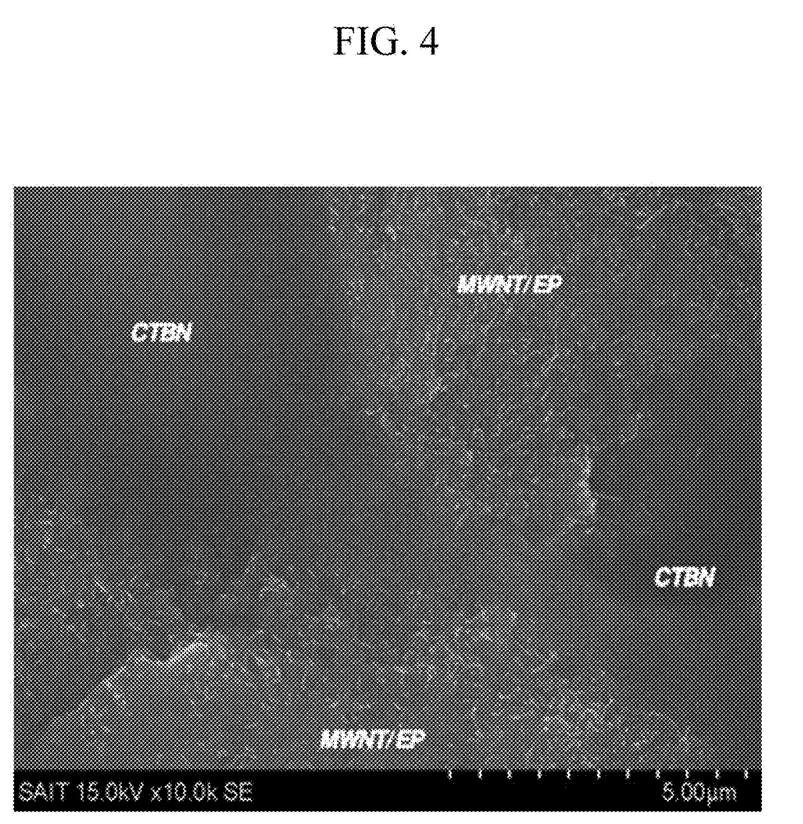
FIG. 4 is a scanning electron microscope image of an electrically conductive composite Including a terminal carboxyl butadiene acrylonitrile copolymer.

Referring to FIG. 4, the composite shows an excluded volume that is separated from a mixture phase of carbon nanotubes and the epoxy resin due to the addition of CTBN.

Figure 5:
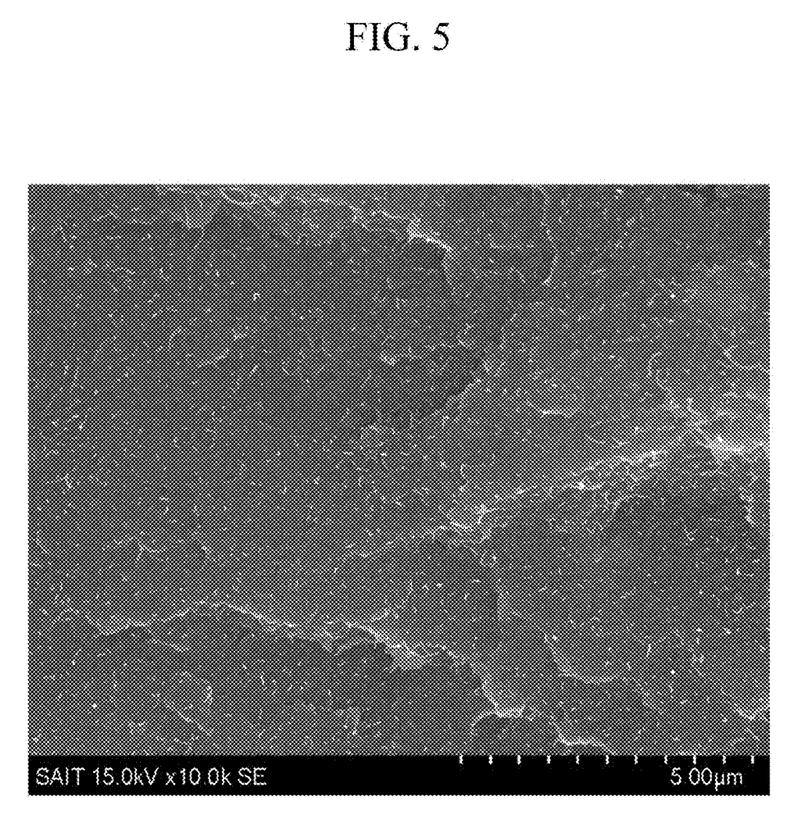
FIG. 5 is a scanning electron microscope image of an electrically conductive composite not including a terminal carboxyl butadiene acrylonitrile copolymer (CTBN) and having no phase-separation.

[2] A composition is obtained by mixing 100 parts by weight of diglycidylether of bisphenol A (DGEBA) (Trade name: YD-128, Manufacturer: Kukdo Chemical Co., Ltd.) as an epoxy resin, 25 parts by weight of polyetheramine (Trade name: D230, Manufacturer: Huntsman Co.) as a hardener, and 10.58 parts by weight of multi-walled carbon nanotubes (average diameter: 9 nm to 15 nm, average length: 1 um to 10 um, Trade name: NC7000, Manufacturer: Nanocyl) according to the same manner as set forth in item I. The composition is heat-treated in the same manner as set forth in item I, obtaining a cured composite. A scanning electron microscope (Model No.: XL30, Manufacturer: Philips) is used to perform a scanning electron microscope analysis of the surface of the composite, and the results are provided in FIG. 5. Referring to FIG. 5, the composite failed to show a excluded volume that is separated from a phase of the mixture of the carbon nanotubes and the epoxy resin by the addition of the CTBN.

[3] A composite is manufactured in the same manner as set forth in item [1], except for using surface-treated MWCNT to have a COOH group. When a scanning electron microscope (Model No.: XL30, Manufacturer: Philips) is used to perform a scanning electron microscope analysis about the surface of the composite, no phase-separation is found.

III. Electrical Conductivity Changes of Composite depending on Addition of Thermoplastic Resin, CTBN Among the results of Table 1, the electrical conductivity of five samples including CNT in an amount of 0.05 wt % and CTBN in different amounts are compiled in Table 2, and the results are shown in FIG. 6.

TABLE 2

| Sample Nos. | Epoxy resin wt % | Hardener wt % | CTBN wt % | CNT wt % | Electrical conductivity S/m |
|---|---|---|---|---|---|
| 4 | 79.96 | 19.99 | 0.00 | 0.05000 | $3.26 \times 10^{-8}$ |
| 35 | 66.63 | 16.66 | 16.66 | 0.05000 | $4.00 \times 10^{-5}$ |
| 15 | 57.11 | 14.28 | 28.57 | 0.05000 | $1.12 \times 10^{-3}$ |
| 36 | 49.97 | 12.49 | 37.48 | 0.05000 | $8.41 \times 10^{-5}$ |
| 26 | 44.41 | 11.10 | 44.44 | 0.05000 | $8.60 \times 10^{-9}$ |

Figure 6:
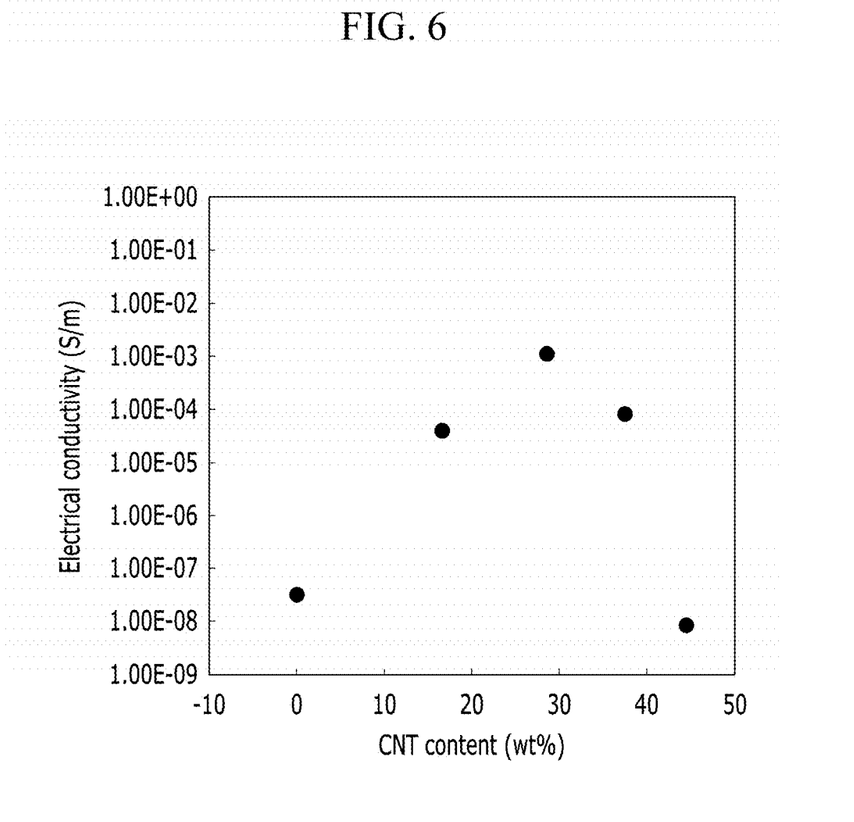
FIG. 6 is a graph of electrical conductivity (Siemens per meter, S/m) vs. carbon nanotube content (weight percent, wt %) showing changes in the electrical conductivity of the electrically conductive composite in response to the addition amount of a thermoplastic resin, i.e., CTBN.

Referring to the results of Table 2 and FIG. 6, when the thermoplastic resin is included in an amount ranging from greater than 16 wt % and less than or equal to 45 wt % (or greater than 20 parts by weight and less than or equal to 80 parts by weight), the composite shows improved electrical conductivity.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A composition for an electrically conductive composite, comprising, based on a total weight of the composition:
   37 weight percent to 84 weight percent of an epoxy;
   0.001 weight percent to about 1 weight percent of an electrically conductive filler; and
   15 weight percent to about 38 weight percent of a thermoplastic resin,
   wherein the thermoplastic resin is a liquid at about 25° C., is miscible with the epoxy, and forms a domain upon heat curing that is phase-separated from the epoxy and the electrically conductive filler,
   wherein the thermoplastic polymer is carboxyl terminated butadiene acrylonitrile (CTBN),
   wherein the electrically conductive filler is carbon nanotubes having no carboxyl group on a surface thereof.

2. The composition of claim 1, wherein the epoxy comprises an epoxy resin having two or more epoxy groups per molecule, and wherein the epoxy resin is one or more selected from a glycidylether of bisphenol A, bisphenol F, dihydroxyphenyl diphenylsulfone, dihydroxybenzophenone, dihydroxydiphenyl, a novolac epoxy resin, and a glycidyl functional group reactive product of one or more selected from m-aminophenol, p-aminophenol, m-phenylene diamine, p-phenylene diamine, 2,4-toluylene diamine, 2,6-toluylene diamine, 3,4-toluylene diamine, 3,3'-diaminodiphenyl methane, and 4,4'-diaminodiphenyl methane.

3. The composition of claim 2, wherein the epoxy resin comprises one or more selected from a diglycidyl ether of bisphenol A; a diglycidyl ether of bisphenol F; O,N,N-triglycidyl-para-aminophenol; O,N,N-triglycidyl-meta-aminophenol; and N,N,N',N'-tetraglycidyl diaminodiphenyl methane.

4. The composition of claim 1, wherein the electrically conductive filler further comprises one or more selected from boron nitride nanotubes, carbon black, graphene, graphite, a conductive metal filament, a conductive metal nanowire, and a conductive metal oxide particulate.

5. The composition of claim 1, wherein the electrically conductive filler does not comprise a functional group which is capable of a condensation reaction with the thermoplastic resin on a surface of the electrically conductive filler.

6. The composition of claim 1, wherein the heat curing is performed at a temperature of greater than or equal to about 50° C. and less than or equal to about 150° C.

7. The composition of claim 1, wherein the domain has a largest diameter of less than or equal to about 50 micrometers.

8. The composition of claim 1, wherein the epoxy includes at least one of diglycidyl ether of bisphenol F, dihydroxyphenyl diphenylsulfone, dihydroxybenzophenone, dihydroxydiphenyl, a novolac epoxy resin, a glycidyl functional group reactive product of m-aminophenol, a glycidyl functional group reactive product of m- p-aminophenol, m-phenylene diamine, p-phenylene diamine, 2,4-toluylene diamine, 2,6-toluylene diamine, 3,4-toluylene diamine, 3,3'-diaminodiphenyl methane, or 4,4'-diaminodiphenyl methane.

9. The composition of claim 5, wherein the surface of the electrically conductive filler is an untreated surface.

10. The electrically conductive composite of claim 1, wherein the CTBN is included in an amount of 26 weight percent to 29 weight percent, based on the total weight of the composition.

11. The electrically conductive composite of claim 1, wherein the composition comprises about 50 to 84 weight percent of the epoxy, based on the total weight of the composition.

12. A conductive polymer composite comprising a cured product of the composition of claim 1.

13. The electrically conductive composite of claim 12, wherein the electrically conductive composite comprises a first domain consisting of the thermoplastic resin and a second domain comprising the epoxy and the electrically conductive filler.

14. The electrically conductive composite of claim 12, wherein the electrically conductive composite has an electrical conductivity of less than or equal to about 0.01 Siemens per meter.

15. An electronic device comprising the conductive polymer composite of claim 12.

* * * * *